United States Patent [19]

Meise et al.

[11] Patent Number: 5,145,239
[45] Date of Patent: Sep. 8, 1992

[54] BRAKE CIRCUIT WITH PRIMARY ELECTRICAL BRAKE PRESSURE CONTROL AND SECONDARY FAILURE RESPONSIVE MECHANICAL BRAKE PRESSURE CONTROL

[75] Inventors: Gunther Meise, Langenhagen; Günter Seegers, Barsinghausen; Manfred Schult, Garbsen, all of Fed. Rep. of Germany

[73] Assignee: WABCO Westinghouse Fahrzeugbremsen GmbH, Hanover, Fed. Rep. of Germany

[21] Appl. No.: 527,105

[22] Filed: May 22, 1990

[30] Foreign Application Priority Data

May 22, 1989 [DE] Fed. Rep. of Germany ....... 3916642

[51] Int. Cl.$^5$ .......................... B60T 13/70; B60T 8/18
[52] U.S. Cl. ........................................ 303/14; 303/15; 303/20; 303/92
[58] Field of Search .................. 303/15, 16, 17, 20, 303/7, 14, 92

[56] References Cited

U.S. PATENT DOCUMENTS

| 4,166,654 | 9/1979 | Snodgrass | 303/14 |
| 4,536,039 | 8/1985 | Barberis | 303/16 |
| 4,671,578 | 6/1987 | Rothen et al. | 303/7 X |
| 4,812,777 | 3/1989 | Shirai | 303/14 |
| 4,818,039 | 4/1989 | Bertling et al. | 303/14 X |
| 4,861,115 | 8/1989 | Petersen | 303/15 |

FOREIGN PATENT DOCUMENTS

| 221967 | 6/1962 | Australia. |
| 243618 | 11/1987 | European Pat. Off.. |
| 3027745 | 2/1982 | Fed. Rep. of Germany. |
| 321475 | 11/1983 | Fed. Rep. of Germany. |
| 3219140 | 11/1983 | Fed. Rep. of Germany. |
| 3230970 | 2/1984 | Fed. Rep. of Germany. |
| 3239970 | 7/1984 | Fed. Rep. of Germany. |
| 3346919 | 7/1985 | Fed. Rep. of Germany. |
| 3603143 | 8/1987 | Fed. Rep. of Germany. |

OTHER PUBLICATIONS

WABCO "Compressed Air Braking Equipment"-,WABCO Automotive Products Group #571,004 Feb. 1988 ed., pp. 120–122.
WABCO "Description of Air Equipment used in Road Vehicles", WABCO Automotive Products Group, Jan. 1982 ed. pp. 88–89.
WABCO "Doppel-Absperrventil", WABCO Westinghouse #434,500, Apr. 1975, pp. 3–4.
WABCO "Wissenswertes Über Pneumatik", WABCO Westinghouse Aug. 1980, pp. 160–161.
WABCO "Reversierschalter", WABCO Westinghouse #441,020, Jan. 1974.

*Primary Examiner*—Robert J. Oberleitner
*Assistant Examiner*—Peter M. Poon
*Attorney, Agent, or Firm*—Horst M. Kasper

[57] ABSTRACT

A known brake circuit comprises a mechanical brake-pressure control device and an electrical brake-pressure control device. The mechanical brake-pressure control device is furnished for assuring an emergency operation in case of a fault of the normally predominance-taking electrical brake-pressure control device. The known brake circuit can be controlled only then in a load-dependent way, when both the mechanical as well as the electrical brake-pressure control unit comprise a load-dependent automatic brake-pressure controller. According to the invention, a restraining device (103 3, 5) is furnished in the mechanical brake-prerssure control device (103 3, 5). The restraining device (3) allows for passage of the brake pressure, set in the mechanical brake-pressure control device (103 3, 5), only in case of a fault in the electrical brake-pressure control device (106 6, 9, 12, 13). The electrical brake-pressure control device (106 6, 9, 12, 13) is thereby accessible to a load-dependent automatic brake-pressure control without the requirement of a load dependent automatic brake-pressure controller in the mechanical brake-pressure control device (103 3, 5).

23 Claims, 12 Drawing Sheets

BRAKE CIRCUIT WITH PRIMARY ELECTRICAL BRAKE PRESSURE CONTROL AND SECONDARY FAILURE RESPONSIVE MECHANICAL BRAKE PRESSURE CONTROL

BACKGROUND OF THE INVENTION

1. Field of the Invention

The invention relates to a brake circuit with at least one actuator operated by feeding of brake pressure and including a mechanical brake-pressure control device and an electrical brake-pressure control device.

2. Brief Description of the Background of the Invention Including Prior Art

Such a brake circuit is known from FIG. 2 of the European Patent Application EP-A-0,088,911. The electrical brake-pressure control device according to the reference EP-A-0,088,911 comprises the electrical part of a brake-value transmitter actuatable by a driver, an electronics with an actual value sensor, and the electrically controlled part of a relay valve controlled by two circuits. Upon actuation of the brake-value transmitter, the brake-value transmitter releases an electrical signal, and after processing in the electronics, the electrical signal is fed to the electrical part of the relay valve. The electrical signal is transformed by the electrical part of the relay valve into a brake pressure for the actuator. The mechanical brake-pressure control device comprises a pressure part of the brake-value transmitter and the pressure-dependent part of the relay valve controlled by two circuits. "Mechanical" is a designation of this brake-pressure control device because the actuating value fed into the brake-value transmitter, is transformed in a conventional way with mechanical means into a brake pressure for the actuator.

The conventional brake circuit is actuated preferably by the electrical brake-pressure control device. This occurs in that the electric signal initiates a quicker actuation of the relay valve controlled by two circuits, because of the large propagation speed of the electrical signal in the corresponding lines, than is the case of the brake pressure transmitted by the pressure part of the brake-value transmitter. In case of a fault in the electrical brake-pressure control device, the brake circuit remains functional based on the mechanical brake-pressure control device, even though this function is at a lower speed.

It is disadvantageous in connection with this conventional brake circuit that the brake circuit is not accessible to a load-dependent automatic brake-force control with the electrical brake-pressure control device. In a conventional way, the electrical signal, delivered by the brake-value transmitter, and thus the brake pressure for the actuator, are corrected dependent on load for achieving such an automatic brake-force control. In such a case, the electrical brake-pressure control device would in fact effect a quick response of the relay valve and thus of the brake circuit according to the conventional circuit. Following to the access and activation phase, however, the brake pressure, transmitted by the pressure part of the brake-value transmitter and not load-dependently corrected, would assume predominance during the control of the relay valve and the load-dependent correction of the brake pressure, based on the electrical brake-pressure control device, would become ineffective.

SUMMARY OF THE INVENTION

1. Purposes of the Invention

It is an object of the present invention to provide a brake circuit which allows with simple means to make the load-dependent automatic brake-force control accessible by way of an electrical brake-pressure control device.

It is another object of the present invention to provide a brake circuit which operates both electrically and mechanically and can include an anti-skid system feature.

These and other objects and advantages of the present invention will become evident from the description which follows.

2. Brief Description of the Invention

The invention assures that, in case of a disturbance in the electrical brake-pressure control device, the switching to the mechanical brake-pressure control device occurs with simple mechanical means.

As mentioned above, the conventional brake circuit is not accessible to a skid protection based on the electrical brake-pressure control device. The above recited facts in connection with the load-dependent automatic brake-force control hold for this case correspondingly. The invention also provides a solution for this specific disadvantage.

The invention can be performed in connection with any suitable pressure means.

The invention further allows a simplification and a decrease in costs of the known brake circuit by allowing substitution of the complicatedly constructed and thus also expensive relay valve, formed for the two-circuit control by markedly different mediae, by simply constructed and substantially commercially available construction components.

Further advantages of the invention are recognized from the drawings, where solid lines or dashed lines, respectively, are employed for the pressure-means conduits, dash-dotted lines are employed for electrical connections, and dotted lines outline brake-pressure control devices, containing two or more components. Furthermore the same reference numerals refer to components with the same function.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
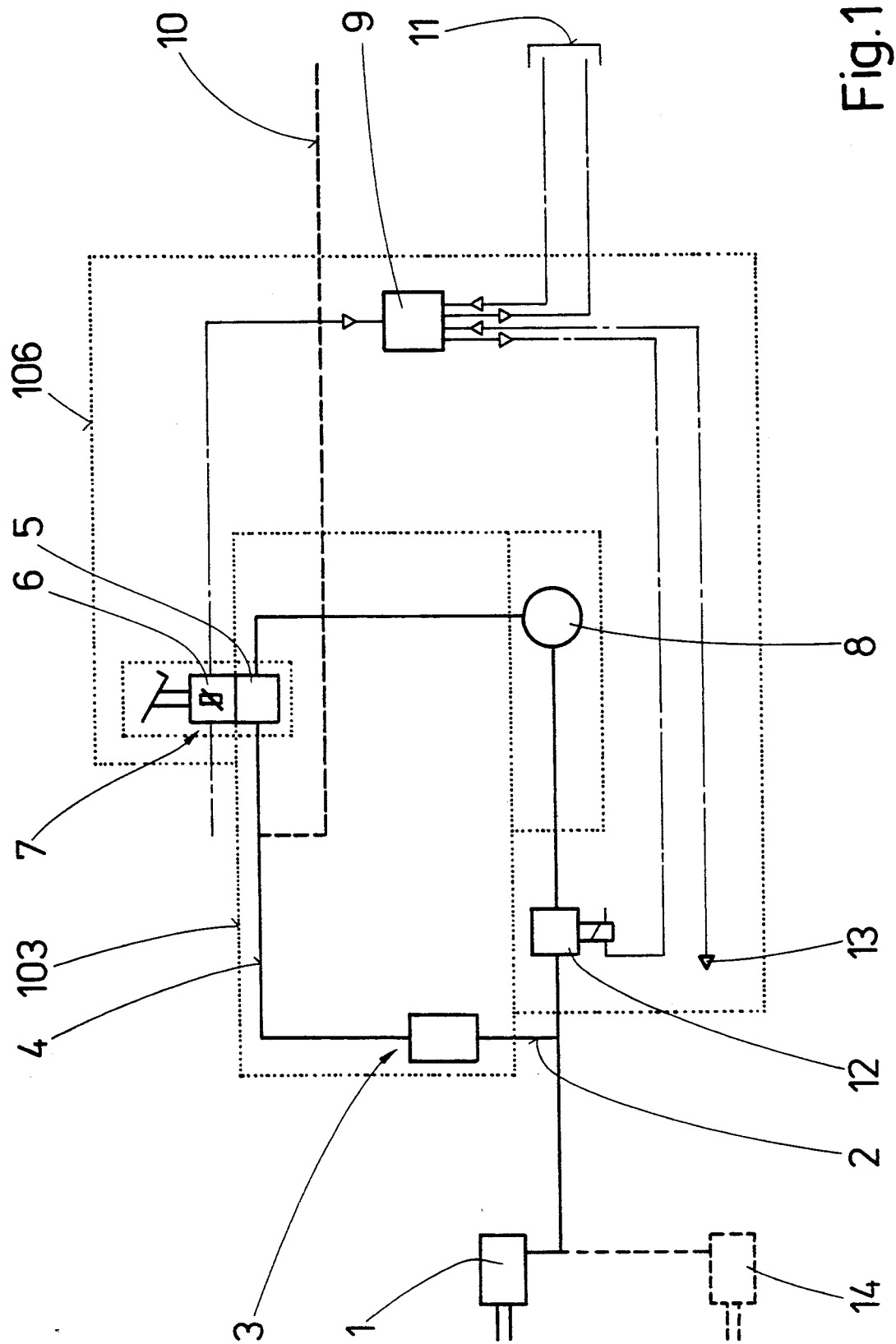
FIG. 1 is a schematic view of a diagram of a brake circuit according to the invention.

FIG. 1 illustrates with solid lines schematically the base construction of a brake circuit with an actuator 1, operated by the feeding-in of brake pressure, as well as with a mechanical brake-pressure control device 103 (3, 5), including a restraining device 3 and a pressure part 5, and an electrical brake-pressure control device 106 (6, 9, 12, 13), including an electrical part 6, electronics 9, a brake-pressure modulator 12, and a brake-value sensor 13. Air serves as pressure means. The following disclosures hold in addition for brake circuits employing different pressure means upon a corresponding adaptation.

The mechanical brake-pressure control device 103 (3, 5) comprises amongst other parts the pressure part 5 of a brake-value transmitter 7. The electrical brake-pressure control device 106 (6, 9, 12, 13) comprises the electrical part 6 of the brake-value transmitter 7, an electronics 9, a brake-value sensor 13 associated with the electronics 9, and a brake-pressure modulator 12.

The recited construction components of the brake circuit can be built in a conventional way.

The brake-value transmitter 7 emits, upon actuation by the driver of the electrical part 6, an electrical signal depending on the actuation force or on the actuation path, and this electrical signal is designated as actuation signal. At the same time, the brake-value transmitter 7 transmits a brake pressure also depending on the recited values at the pressure part 5 from a pressure storage 8. The brake pressure represents the brake pressure set in the brake-pressure control device 103 (3, 5).

The electronics 9 receives the actuation signal and processes this actuation signal to a corresponding switch-on signal to the brake-pressure modulator 12. The brake-pressure modulator 12 is connected, on the one hand, to the pressure storage 8 and, on the other hand, to the actuator 1 and connects, during the receiving of the switch-on signal, the actuator 1 to the pressure storage 8 such that a brake pressure can be built up in the pressure storage 8.

The electronics 9 forms also a reference signal from the actuation signal. The signal of the brake-value sensor 13, designated in the following as brake-value signal, is compared with the reference signal by the electronics 9. If the brake-value signal and the reference signal are equal, then the electronics 9 turns off the switch-on signal, whereupon the brake-pressure modulator 12 separates the actuator 1 from the pressure storage 8. Based on the electrical brake-pressure control device 106 (6, 9, 12, 13), the brake pressure in the actuator 1 is limited, to such a value where the brake-value signal, and thus the corresponding brake value, would have reached a value preset by the actuation signal and thus indirectly by the motor vehicle driver. Upon back-actuation of the brake-value transmitter, i.e. in case of a decrease of the actuation force or of the actuation path, respectively, the recited functions occur in reverse direction, wherein the corresponding brake-pressure decrease in the actuator 1 occurs in that, in this case, the brake-pressure modulator 12 connects the actuator 1 to the atmosphere.

The brake pressure itself can be considered as a brake value and, in this case, the electrical brake-pressure control device 106 (6, 9, 12, 13) forms an automatic control circuit for the brake pressure. In this case, the brake-value sensor 13 is frequently integrated into the brake-pressure modulator 12.

Alternatively, different parameters of the brake circuit can be considered as brake values. For example, if the brake value is the brake force generated by way of the brake pressure in the actuator 1 and the respective wheel brake, then the electrical brake-pressure control device 106 (6, 9, 12, 13), the actuator 1, and the wheel brake form an automatic control circuit for this brake force with the brake pressure as a function control element. Further parameters, which could be considered as a brake value, are for example the temperature of the wheel brake, the adhesion of the wheels braked by way of the brake circuit, and the motor vehicle deceleration.

The mechanical brake-pressure control device 103 (3, 5) comprises further a restraining device 3. This restraining device achieves that the actuator 1 is fed with the brake pressure predominantly through the electrical brake-pressure control device 106 (6, 9, 12, 13). The actuation of the brake circuit is thus to be performed electrically controlled in standard operation and pressure-controlled in emergency operation, i.e. in case of a faulty and disturbed electrical brake-pressure control device 106 (6, 9, 12, 13).

For this purpose, the restraining device 3 is formed, according to a first embodiment, such that the restraining device 3 retains the brake pressure set in the mechanical brake-pressure control device 103 (3, 5), i.e. the brake pressure transmitted by the pressure part 5, for such a time as the electrical brake-pressure control device 106 (6, 9, 12, 13) transmits a brake pressure. The restraining device 3 is disposed in a pressure line including a line section 2 and a conduit section 4 and connecting the pressure part 5 to the actuator 1. Thereby, the restraining device 3 captures the brake pressure transmitted, on the one hand, in standard operation by the pressure part 5 and, on the other hand, the brake pressure transmitted by the electrical brake-pressure control device 106 (6, 9, 12, 13). The first recited brake pressure, transmitted by the pressure part 5, prevails in the conduit section 4 disposed upstream of the restraining device 3. The last recited brake pressure, transmitted by the electrical brake pressure control device 106, prevails in the conduit section 2 disposed downstream of the restraining device 3. The restraining device 3 thus has to be formed in a suitable way in detail such that the restraining device 3 blocks the pressure line 2, 4 as long as the electrical brake-pressure control device 106 (6, 9, 12, 13) transmits a higher brake pressure than atmospheric pressure. According to this embodiment, the fault of the electrical brake-pressure control device 106 (6, 9, 12, 13) is defined as the total failure, whereby a possibly unavoidable residual brake pressure is not counted.

According to a further embodiment, the restraining device 3 is formed such that the restraining device 3 retains the brake pressure set in the mechanical brake-pressure control device 103 (3, 5) for such a time as this brake pressure is not at least a preset multiple of the brake pressure transmitted by the electrical brake-pressure control device 106 (6, 9, 12, 13). This embodiment is associated with the advantage relative to the first recited embodiment that, based on the purposeful determination of the pressure multiple at which the switching occurs, already a limitation of the operability of the electrical brake-pressure control device 106 (6, 9, 12, 13) is defined as a fault and not only total or a nearly total failure of the electrical brake-pressure control device 106 (6, 9, 12, 13). In this case, the restraining device 3 has to be formed as reacting in a suitable way to the ratio of the brake pressures prevailing in the conduit sections 2 and 4.

FIG. 1 illustrates in addition to the above-described base structure of the brake circuit also advantageous further embodiments of the circuit with dashed lines.

Representative for additional actuators, a second actuator is designated with the reference numeral 14. If the actuators 1, 14 are disposed at an axle of a vehicle and are distributed on two vehicle sides, then the mechanical brake-pressure control device 103 (3, 5) and the electrical brake-pressure control device 106 (6, 9, 12, 13) and the anti-skid system device, described in more detail below, are operating on a respective axle. The actuators 1, 14 can also be distributed on different vehicle axles.

The reference numerals 10 and 11 indicate that the brake-value transmitter 7 and the electronics 9 can be components of the mechanical or, respectively, the electrical brake-pressure control devices of additional brake circuits.

Figure 2:
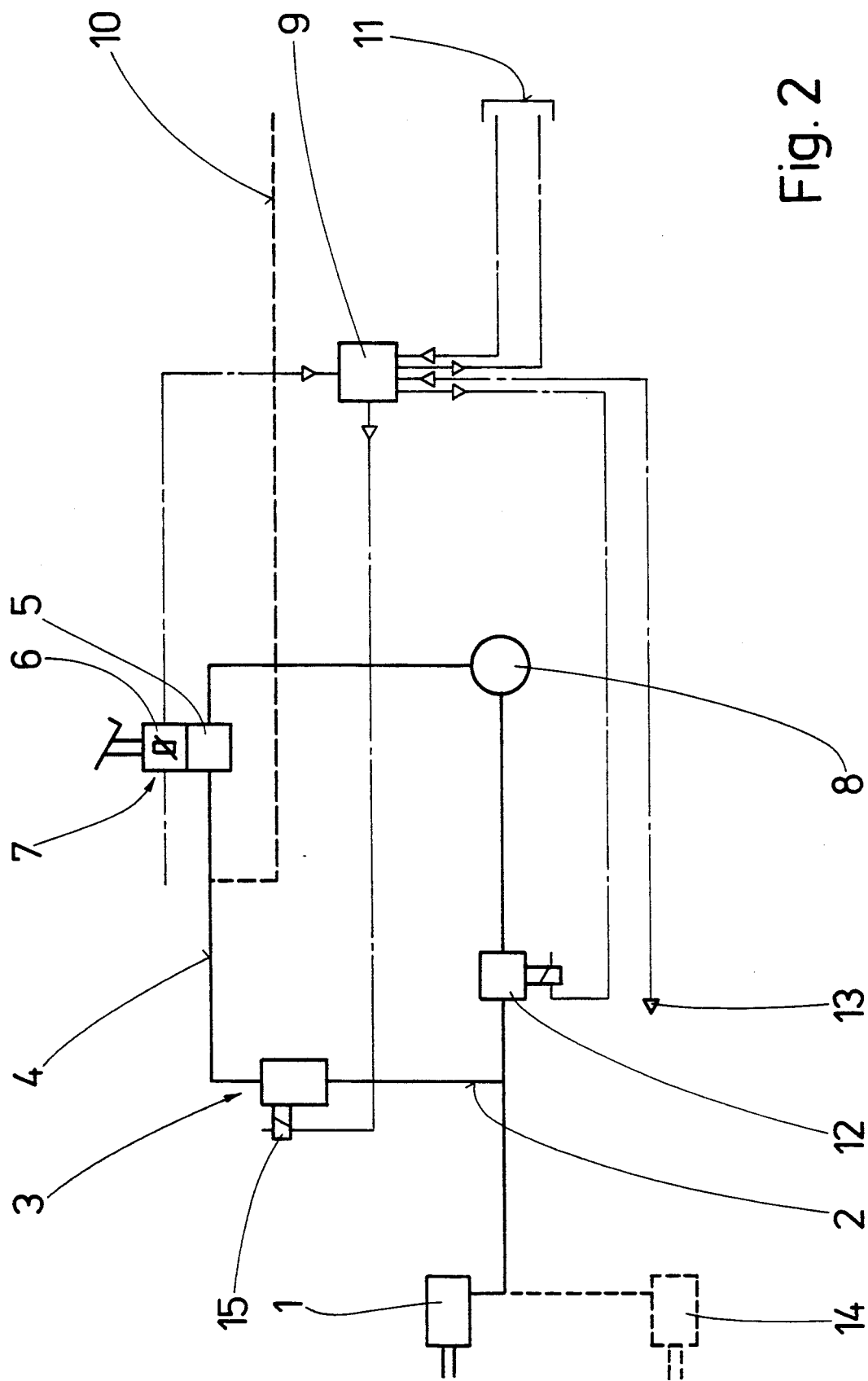
FIG. 2 is a schematic view of a second embodiment of a brake circuit according to the invention.
Figure 3:
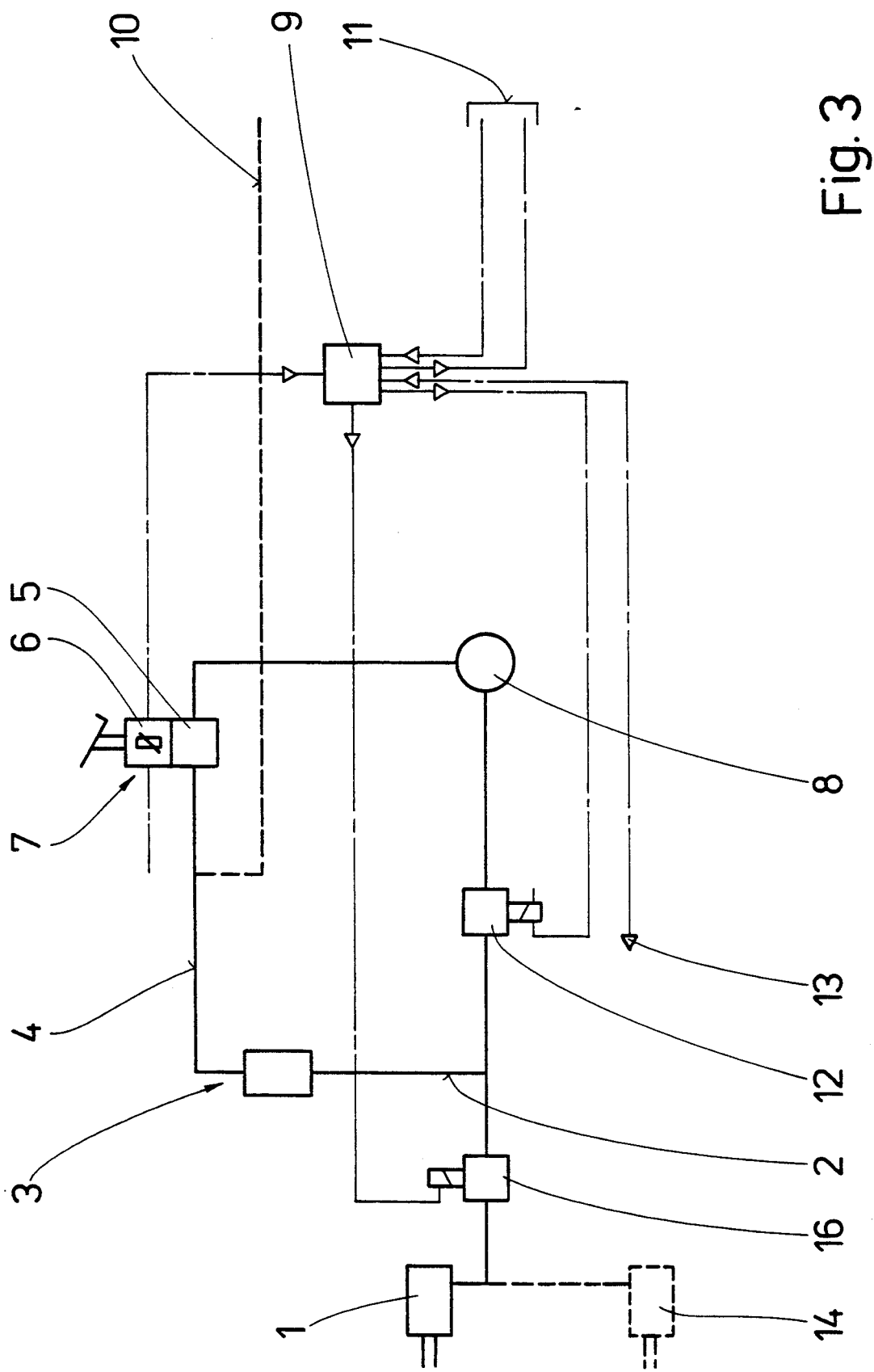
FIG. 3 is a schematic view of a third embodiment of a brake circuit according to the invention.
Figure 4:
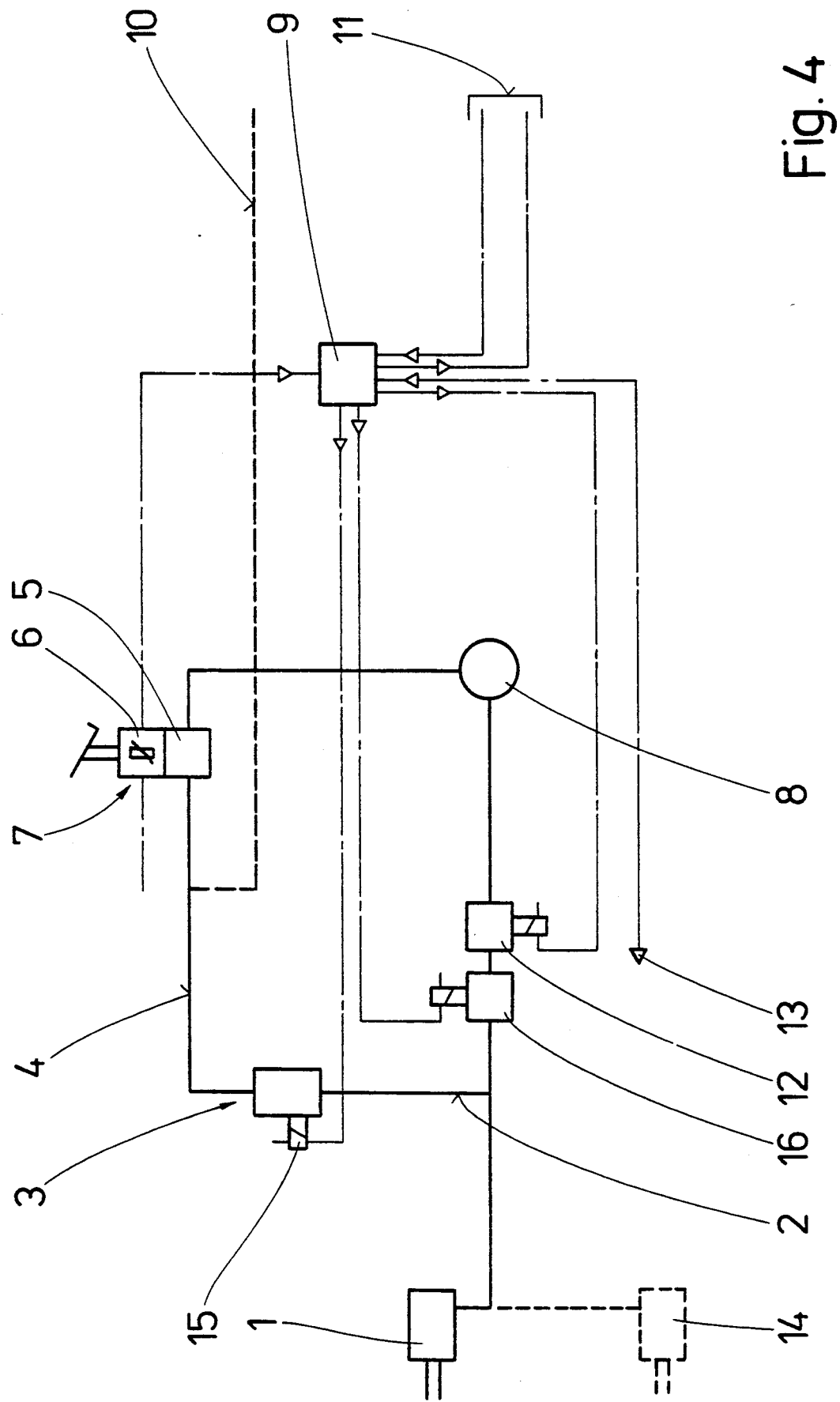
FIG. 4 is a schematic view of a fourth embodiment of a brake circuit according to the invention.

The above recited brake circuit is enhanced, according to FIGS. 2, 3, and 4, by incorporating and integrating a blocking protection device, designated hereafter as anti-skid system, into the electrical brake-pressure control device 106 (6, 9, 12, 13).

The anti-skid system comprises in a conventional way sensors for the wheel rotation speed, an anti-skid system electronics, and automatic control valves, which are designated hereafter as anti-skid-system valves. The wheel-rotation speed sensors are not illustrated for purposes of transparency and overview possibilities. The anti-skid-system electronics is assumed to be integrated in a conventional way into the electronics 9. The anti-skid-system electronics can however also be provided in a conventional way separate from the electronics 9.

The brake-pressure modulator 12, according to FIG. 2, serves simultaneously as an anti-skid-system valve, whereas a separate and individual anti-skid-system valve 16 is provided in FIGS. 3 and 4.

The restraining device 3 is furnished, according to FIG. 2, with an electrical control device indicated by the reference numeral 15. The electrical control device 15 is electrically connected to the electronics 9 and switches, independent of the brake pressures in the conduit parts 2 and 4, the restraining device 3 into its restraining position by way of the electronics 9 by the anti-skid system upon operation of an anti-skid-system operational mode. An unintended and, under certain circumstances, disadvantageous switching to the mechanical brake-pressure control device 103 (3, 5) is thereby avoided by the anti-skid- system in case of a lowering of the brake pressure transmitted by the electrical brake-pressure control device 106 (6, 9, 12, 13).

The anti-skid-system valve 16 is disposed, according to FIG. 3, downstream of the restraining device 3 as seen relative to the electric brake-pressure control device 106 (6, 9, 12, 13). This means that the anti-skid-system valve 16 does not influence the pressure present in the conduit part 2. In this case, the restraining device 3 captures the brake pressure transmitted by the electrical brake-pressure control device 106 (6, 9, 12, 13) also during the anti-skid-system operation. Therefore, the possibility mentioned in case of the brake circuit according to FIG. 2, of a switching to the mechanical brake-pressure control device 103 (3, 5), does not exist during the anti-skid-system operation such that the above-recited electrical control device 15 can be dispensed with at the restraining device 3.

The anti-skid-system valve 16 is disposed, as illustrated in FIG. 4, upstream of the restraining device 3, as seen relative to the electrical brake-pressure control device 106 (6, 9, 12, 13). Thus, the anti-skid-system valve 16 is disposed such that it captures also the pressure prevailing in the conduit part 2. In this case, the restraining device 3 captures the influences arising from the anti-skid-system valve 16 on the brake pressure transmitted by the electrical brake-pressure control device (6, 9, 12, 13). Therefore, the possibility exists here again to switch to the mechanical brake-pressure control device (3, 5) during the anti-skid-system operation such that the restraining device 3 requires the electrical control device 15 analogous to the requirements of the brake circuit according to FIG. 2.

Figure 5:
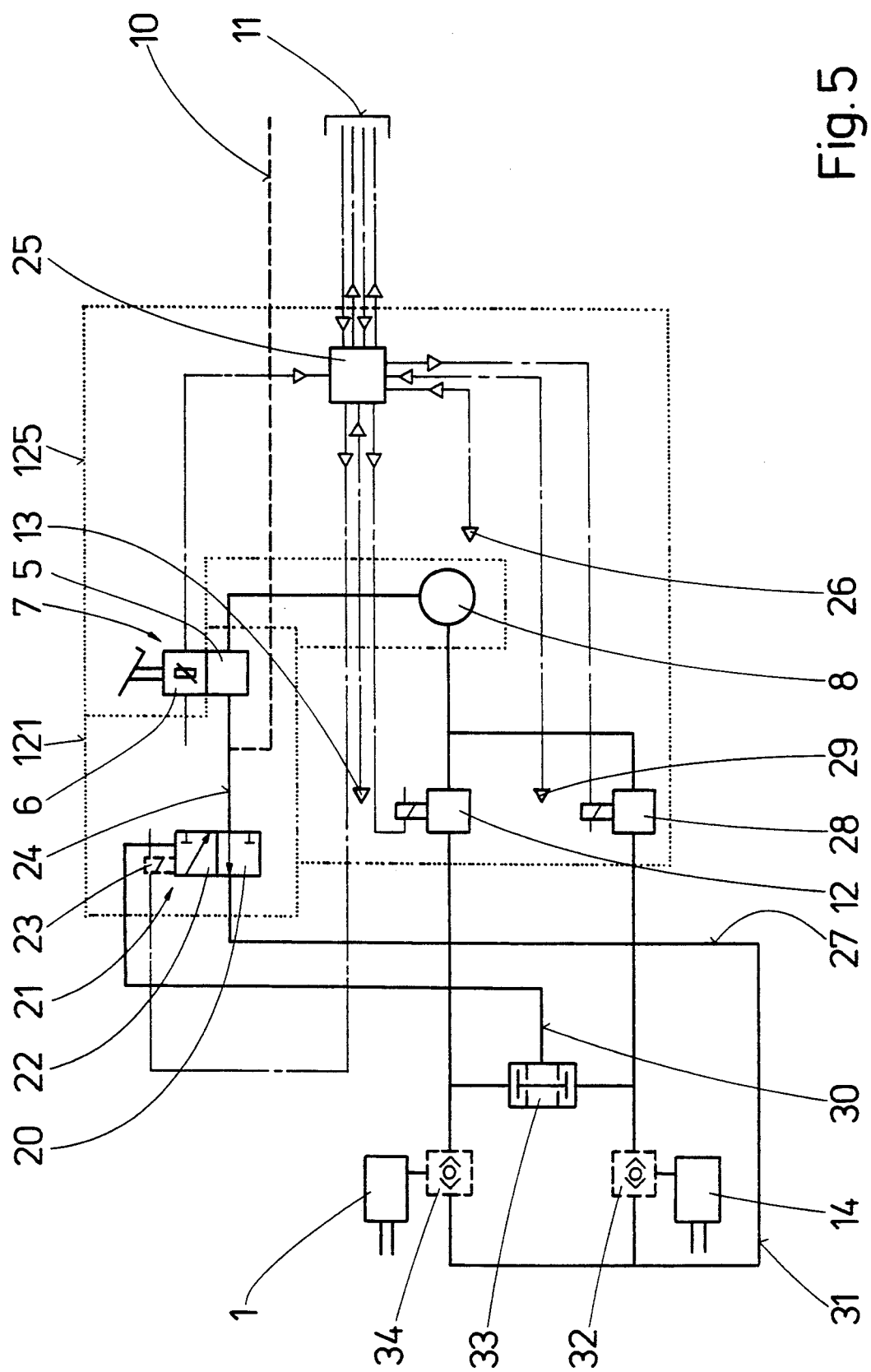
FIG. 5 is a schematic view of an embodiment of the brake circuit according to FIG. 1 with additional features.

The brake circuit illustrated in FIG. 5 exhibits the actuators 1 and 14. The electrical brake-pressure control device 125 (6, 25, 12, 13, 28, 29) is subdivided in part onto the actuators 1 and 14, respectively, such that the electrical brake-pressure control device in each case transmits an own brake pressure for each actuator 1 and 14, respectively. The subdivision comprises that the brake-pressure modulator 12 and the brake-value sensor 13 are coordinated only to one actuator 1, while a further brake-pressure modulator 28 and a further brake-value sensor 29 are coordinated to the other actuator 14. The electronics, designated here with the reference numeral 25, exhibits for each group, comprised of brake-pressure modulator 12 and brake-value sensor 13 or, respectively, brake-pressure modulator 28 and brake-value sensor 29, its own channel, where the channel, when considered alone and separate, operates in the same way as the complete electronics 9 of the previously described embodiment. The subdivision is a "partial" subdivision since the electrical part 6 of the brake-value transmitter 7 does not furnish its own actuation signal for each channel of the electronics 25.

The mechanical brake-pressure control device, here designated with 121 (5, 21), exhibits a pressure-controlled 3/2-way valve 21 as a restraining device. This 3/2-way valve 21 is disposed in a pressure conduit 24, 27, 31, which pressure conduit 24, 27, 31 reaches from the pressure part 5 of the brake-value transmitter 7 to the actuators 1 and 14. This 3/2-way valve (21) is fed on the control side with said brake pressure transmitted by the electrical brake-pressure control device ((125) 6, 25, 12, 13, 28, 29).

The 3/2-way valve 21 is furnished on its control side with the brake pressure transmitted by the electrical brake-pressure control device 125 (6, 25, 12, 13, 28, 29). For this purpose, the control input of the 3/2-way valve is connected via a pressure line 30 and a double blocking device 33 to the outlets of the two brake-pressure modulators 12 and 28. The double blocking device 33 is furnished such that it passes the lower pressure of the pressures, present at its inputs, into the pressure line 30.

Thus, the lower one of the brake pressures, transmitted by the brake-pressure modulators 12 and 28, is fed to the 3/2-way valve 21 on the control side.

A dual shut-off device of the recited kind is known, for example, from the printed publication WABCO WESTINGHOUSE "Doppel-Absperrventil 434,500" (dual shut-off valve).

The brake circuit described so far in its base construction, operates as follows.

In case of a non-actuated brake circuit, the 3/2-way valve 21 is disposed in its passage position designated with reference numeral 20, where the 3/2-way valve 21 in its passage position 20 holds open the pressure line 24, 27, 31. The 3/2-way valve 21 can be furnished, in a conventional way, with a restoring device, such as, for example, a restoring spring, for the safe adjustment of the passage position 20.

If the brake-value transmitter 7 is actuated while the electrical brake-pressure control device 125 (6, 25, 12, 13, 28, 29) is intact and active, then each brake-pressure modulator 12 and 28 transmits an own brake pressure to the coordinated actuator 1 or, respectively, 14. The lower one of the own brake pressures is passed by the double blocking device 33 into the pressure line 30, is applied at the control input of the 3/2-way valve 21, and switches the 3/2-way valve 21 into its blocking position designated by reference numeral 22, where it closes in its blocking position 22 the upstream-disposed conduit part 24 and connects the downstream-disposed conduit part 27, 31 to the atmosphere. The brake pressure transmitted by the pressure part 5 of the brake-value transmitter 7 into the conduit part 24, i.e. the brake pressure set in the mechanical brake-pressure control device 121 (5, 21), thus cannot pass through to the actuators 1 and 14. Thus, under normal operating conditions, the brake circuit is controlled by the electrical brake-pressure control device 125 (6, 25, 12, 13, 28, 29).

If the electrical brake-pressure control device 125 (6, 25, 12, 13, 28, 29) is faulty, i.e. if no brake pressure is built up upon actuation of a brake-value transmitter 7 at the outlet of a brake-pressure modulator 12 or 28 or at the outlets of the two brake-pressure modulators 12 and 28, and thus in the coordinated actuator or actuators, respectively, then the 3/2-way valve 21 does not receive a control pressure at the control input and remains in the passage position 20. In the now prevailing emergency operation, the brake pressure transmitted by the pressure part 5 is passed to the actuators 1 and 14, in other words, there is a switching from the electrical brake-pressure control device 106 (6, 25, 12, 13, 28, 29) to the mechanical brake-pressure control device 105 (5, 21).

It is to be noted that, in case the 3/2-way valve 21 is furnished with a restoring device, the just recited fault, generating a switching, is present not only upon total failure of the brake pressure at the outlet of a brake-pressure modulator 12 or, respectively, 28 or at the outlets of the two brake-pressure modulators 12 and 28, but a switching is already present at a residual brake pressure based on the effect of the restoring device.

The double blocking device 33 furnishes that only one 3/2-way valve 21 is required as a restraining device. It would be an alternative if the actuators 1 and 14 would each be coordinated to its own respective 3/2-way valve and to couple these 3/2-way valves in such a way that they effect a switching to an undivided mechanical brake-pressure control device in case of failure of the brake pressure or, respectively, in case of a drop in the brake pressure to the residual brake pressure at the outlet of a brake-pressure modulator.

The embodiment illustrated comprises in addition to the recited base structure also in dashed lines the enhanced embodiments illustrated in the following.

An additional electrical control device of the 3/2-way valve 21 is indicated the reference numeral 23. By way of each additional electrical control device 23, the 3/2-way valve 21 is switchable, in case of the integration of an anti-skid system in the electrical brake-pressure control device 106 (6, 25, 12, 13, 28, 29), by the electronics 25 into the blocking position 22 during an anti-skid-system operation. The electrical control device 23 thus assumes the function of the electrical control device 15 schematically illustrated in the brake circuits of FIGS. 2 and 4 in case of the present brake circuit. In case of the presence of the anti-skid system, as illustrated in FIG. 5, analog to FIG. 2, the brake-pressure modulators 12 and 28 serve as anti-skid system valves. This brake circuit can alternatively be equipped with separate anti-skid-system valves, where the remarks made in connection with FIGS. 3 and 4 hold correspondingly for the disposition of the anti-skid-system valves and the necessity of the additional electrical control device 23 at the 3/2-way valve 21. However, based on the partial subdivision of the electrical brake-pressure control device 106 (6, 25, 12, 13, 28, 29), an individual anti-skid-system valve is necessary for each actuator 1 and 14.

Based on a load sensor 26 surveying the loading of the vehicle or of the axle(s) coordinated to the brake circuit, it is indicated that the electrical brake-pressure control device 106 (6, 25, 12, 13, 28, 29) can contain a load-dependent automatic brake-pressure controller. In this case, the load signal of the load sensor 26 is taken into consideration by the electronics 25 in the formation of the reference signal, which can lead to a decrease of the reference signal and thus of the brake pressures transmitted by the brake-pressure modulators 12 and 28 in case of a not fully loaded vehicle or, respectively, in case of a not fully loaded axle. Based on the described predominance of the electrical brake-pressure control device 106 (6, 25, 12, 13, 28, 29), this automatic brake-pressure controller functions in a standard operation.

A load-dependent automatic brake-pressure controller is not furnished in the mechanical brake-pressure control device 121 (5, 21) such that the brake circuit experiences only in standard operation a load-dependent automatic brake-force control according to this embodiment. An, in principle possible, load-dependent automatic brake-pressure control would mean a cost increase of the mechanical brake-pressure control device 121 (5, 21). A load-dependent automatic brake-pressure control can be dispensed with since this automatic control device assures only the emergency operation.

For separating of the parts carrying the brake pressure of the electrical brake-pressure control device 106 (6, 25, 12, 13, 28, 29) and of the mechanical brake-pressure control device 121 (5, 21), the actuators 1 and 14 have to be furnished as two-circuits devices in the up-to-now described area, i.e. for example, the actuators 1 and 14 have one individual chamber for each brake-pressure control device. The actuators 1 and 14, however, can be normal single-circuit devices, if the brake pressure is fed to them via predisposed two-way valves, which are indicated by the reference numerals 32 and 34. As illustrated, the two-way valves 32 and 34 are connected, on the one hand, with the outlet of the brake-pressure modulator 12 or 28, respectively, coordinated to the actuator 1 or 14, respectively, and, on the other hand, with the conduit part 31, wherein the conduit part 31 brings about the brake pressure controlled by the mechanical brake-pressure control device 121 (5, 21) under emergency operation.

Figure 6:
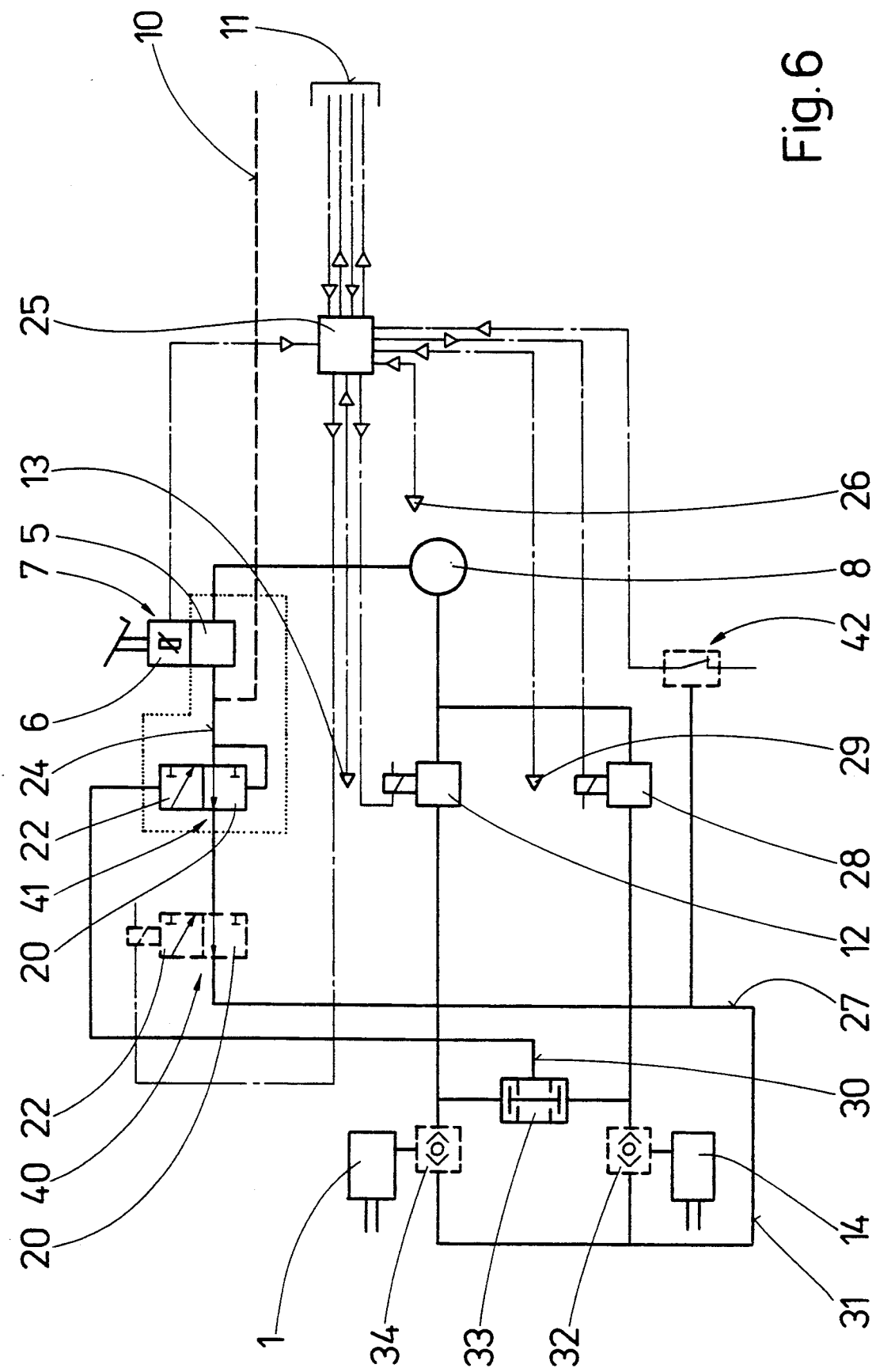
FIG. 6 is a schematic view of another embodiment of the brake circuit according to FIG. 1 with additional features.

The 3/2-way valve 21 of the preceding embodiment is substituted by a 3/2-way valve 41 in the brake circuit according to FIG. 6, which 3/2-way valve 41 can be controlled based on the ratio of two pressures. Thus, the mechanical brake-pressure control device is designated in this case with the reference numerals 141 (5, 41). The 3/2-way valve (41) is controlled by the ratio of two pressures. The 3/2-way valve (41) is fed at one control input with the brake pressure transmitted by the electrical brake-pressure control device ((125) 6, 25, 12, 13, 28, 29) and at a second control input with the brake pressure set by said pressure part of said brake-valve transmitter.

Such a 3/2-way valve is known, for example, from the pocketbook of the WABCO Westinghouse Steuerungstechnik (WABCO Westinghouse Fluid Power) "Wissenswertes Uber Pneumatik," Edition 1980, page 160, as a non-element or as an inhibition. The 3/2-way valve 41 exhibits two control inputs. The 3/2-way valve 41 is connected and charged at the one control input via the pressure line 30 and the double-blocking device 33 with the one brake pressure of the brake pressures transmitted by the brake-pressure modulators 12 and 28, which brake pressure is lower than the brake pressures controlled by the electrical brake-pressure control device 125 (6, 25, 12, 13, 28, 29). The 3/2-way valve 41 is fed and charged at the second control input with the brake pressure transmitted by the pressure part 5 of the brake-value transmitter 7 representing the set value of the brake pressure in the mechanical brake-pressure control device 141 (5, 41). The latter feeding with the brake pressure can, as illustrated, be performed via an outer stub line, branching off of the conduit part 24, but alternatively also via an internal connection, not illustrated.

According to a further embodiment of the 3/2-way valve 41, this 3/2-way valve 41 and the control structures are formed such that the 3/2-way valve 41 is switched from the passage position, again designated with the reference numeral 20, into the blocking position, again designated with the reference numeral 22, as long as the brake pressure, transmitted by the pressure part 5, does not amount to a predetermined multiple or more of the brake pressure present in the pressure line 30, which is the case when the electrical brake-pressure control device 125 (6, 25, 12, 13, 28, 29) operates properly.

According to a further embodiment, the 3/2-way valve 41 and the control structures are formed such that the 3/2-way valve 41 is retained in the blocking position 22 as long as the brake pressure, transmitted by the pressure part 5, does not amount to the predetermined multiple of the brake pressure present in the pressure line 30. In this case, the 3/2-way valve is disposed in the blocking position 22 even if the brake circuit is not actuated.

As compared to the preceding brake circuit, this brake circuit includes an advantage already recited for the embodiment according to FIG. 1. In particular, a limitation of the operational capability of the electrical brake-pressure control device 125 (6, 25, 12, 13, 28, 29) is already defined as a fault and not only the total or nearly total failure of the electrical brake-pressure control device 125 (6, 25, 12, 13, 28, 29).

The definition of the factual situation "fault" is based on a presetting of the multiple and can be adapted to the characteristic of the respective application in each case. In case this brake circuit is formed for a load-dependent automatic brake-force control of the above-recited kind, it is advantageous that the above-recited preset multiple is equal to or substantially equal to the largest occurring automatic control ratio of the automatic brake-pressure controller. Thereby, a switching to the mechanical brake-pressure control device 141 (5, 41) is avoided within the automatic control region of the load-dependent automatic brake-pressure controller.

In case an anti-skid system is integrated into the electrical brake-pressure control device 125 (6, 25, 12, 13, 28, 29) of this embodiment, then the above statements relative to the formation and disposition of the anti-skid-system valves hold true correspondingly. For this case, an electrically controlled 3/2-way valve 40 is illustrated with dashed lines for the acceptance and performance of the functions of the above-recited additional electrical control devices 15 or 23, respectively. The 3/2-way valve 40 is disposed in the pressure line 24, 27, 31 in series to the 3/2-way valve 41. The 3/2-way valve 40 is illustrated downstream of the 3/2-way valve 41. However, the 3/2-way valve 40 can also be disposed upstream of the 3/2-way valve 41, providing the same effective operation.

The 3/2-way valve 40 is also controlled by the electronics 25. Outside of an anti-skid-system operation, the 3/2way valve 40 assumes its passage position, designated again with the reference numeral 20, and, in case of an anti-skid-system operation, the 3/2-way valve 40 is switched by the electronics 25 into its blocking position, designated again with the reference numeral 22. In the blocking position, the 3/2-way valve 40 effects, independent of the position of the 3/2-way valve 41, a transmission of the brake pressure, transmitted by the pressure part 5 in the conduit part 24, to the actuators 1 and 14 and thus a switching to the mechanical brake-pressure control device 141 (5, 41).

The embodiment illustrates in dashed lines a threshold-value pressure switch 42 surveying the pressure in the conduit part 27, 31 disposed downstream of the 3/2-way valve 41 as a further enhancement. This threshold-value pressure switch 42 is connected electrically to the electronics 25 and switches off this electronics 25 and thus the electrical brake-pressure control device 125 (6, 25, 12, 13, 28, 29), if the pressure in the conduit part 27, 31 has reached the threshold value at one point in time. It is thereby assured that the electrical brake-pressure control device 125 (6, 25, 12, 13, 28, 29), once recognized as faulty, cannot be reset without a preceding manual interception. For example, if the present 3/2-way valve 40 is disposed downstream of the 3/2-way valve 41, then the threshold-pressure switch 42 can be disposed between the two 3/2-way valves.

Figure 7:
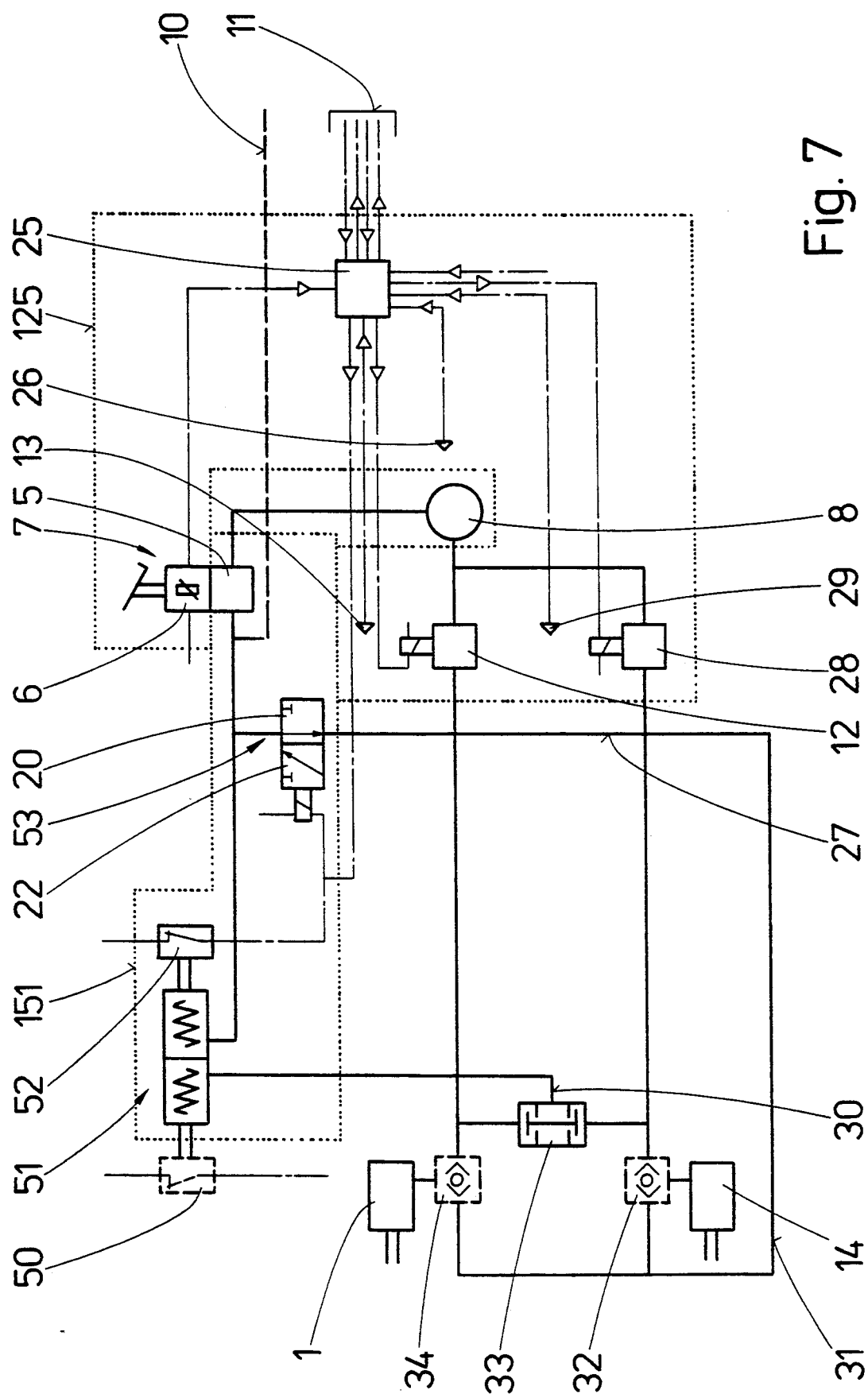
FIG. 7 is a schematic view of a further embodiment of the brake circuit according to FIG. 1 with additional features.

The restraining device comprises in the brake circuit of FIG. 7 an electrical pressure-ratio switch 51 and an electrically controlled 3/2-way valve 53 such that the mechanical brake-pressure control device carries here the reference numerals 151 (5, 51, 53). The electrical pressure-ratio switch (51) is fed, on the one hand, with the brake pressure transmitted by the electrical brake-pressure control device ((125) 6, 25, 12, 13, 28, 29) and, on the other hand, with the brake pressure set by said pressure part of said brake-valve transmitter and an electrically controlled 3/2-way valve (53) controlled by an output signal of the electrical pressure-ratio switch (51).

The pressure-ratio switch 51 is formed such that it switches an integrated switching element 52 as long as two pressures applied to the pressure-ratio switch 51 do not reach a predetermined ratio relative to each other. Such a pressure ratio switch 51 is known, for example from the WABCO Westinghouse printed publication "Reversierschalter 446,020." The pressure-ratio switch 51 is subjected in the embodiment, on the one hand, via the pressure line 30 and the double-blocking device 33 to the lower brake pressure of the brake pressures, transmitted by the brake-pressure modulators 12 or 28, respectively, and, on the other hand, to the brake pressure transmitted by the pressure part 5 of the brake-value transmitter 7 in the conduit part 24 as the brake pressure set in the mechanical brake-pressure control device 151 (5, 51, 53). The pressure ratio switch 51 is set such that the switching element 52 switches as long as the brake pressure, transmitted by the pressure part 5 does not amount to or exceed the predetermined multiple of the brake pressure in the pressure line 30 recited in the preceding embodiment which is clearly the case where an electrical brake-pressure control device 125 (6, 25, 12, 13, 28, 29) operates properly.

The 3/2-way valve 53 corresponds to the 3/2-way valve 40 of the preceding embodiment and is disposed, just as the 3/2-way valve 40, in the pressure conduit 24, 27, 31. The control device of the 3/2-way valve 53 is electrically connected to the switching element 52. Upon an actuation of the brake circuit in case of a properly operating electrical brake-pressure control device 125 (6, 25, 12, 13, 28, 29), the pressure-ratio switch 51 switches via its switching element 52 the 3/2-way valve 53 from its passage position, again designated with the reference numeral 20, to its blocking position, again designated with the reference numeral 22.

Upon a fault in the electrical brake-pressure control device 125 (6, 25, 12, 13, 28, 29), and upon actuation of the brake circuit, a pressure builds up in the pressure line 30 only, where the brake pressure transmitted by the pressure part 5 reaches or exceeds the recited multiple such that the pressure-ratio switch 51 does not switch the 3/2-way valve 53 into the blocking position with the consequence that the mechanical brake-pressure control device 151 (5, 51, 53) becomes effective and active and the emergency operation is initiated.

Thus, the pressure-ratio switch 51 and the 3/2-way valve 53 cooperate and coact in this embodiment such as the 3/2-way valve 41 of the preceding embodiment in the first recited embodiment structure. The structure of the other embodiment structures of the 3/2-way valve 41 is also possible upon a corresponding formation of the 3/2-way valve 53 and of the pressure-ratio switch 51, in particular of the switching element 52 of the pressure-ratio switch 51.

In this case, an anti-skid system can also be integrated into the electrical brake-pressure control device 125 (6, 25, 12, 13, 28, 29) in the way described above. As illustrated, in this case the control device of the 3/2-way valve 53 can be connected parallel to the switching element 52 with the electronics 25 such that this electronics 25 switches the 3/2-way valve 53 in its blocking position during an anti-skid-system operation, whereby the function of the above-recited additional control devices 15 and 23 is assured for practically no additional equipment expenditures.

Depending on the construction of the control device of the 3/2-way valve 53, the switching of the switching element 52 can be considered as an opening or a closing.

According to a further enhancement of the present embodiment, the pressure-ratio switch 51 can be equipped with a further switching element 50, indicated by dashed lines. The further switching element 50 is switched if the brake pressure, transmitted by the pressure part 5, reaches or exceeds the recited predetermined multiple. The switching element 50 is electrically connected to the electronics 25 and puts the electrical brake-pressure control device 125 (6, 25, 12, 13, 28, 29) out of operation until a manual interception takes place. The switching element 50 therefore represents an alternative to the threshold-pressure switch 42 described in the preceding embodiment.

Figure 8:
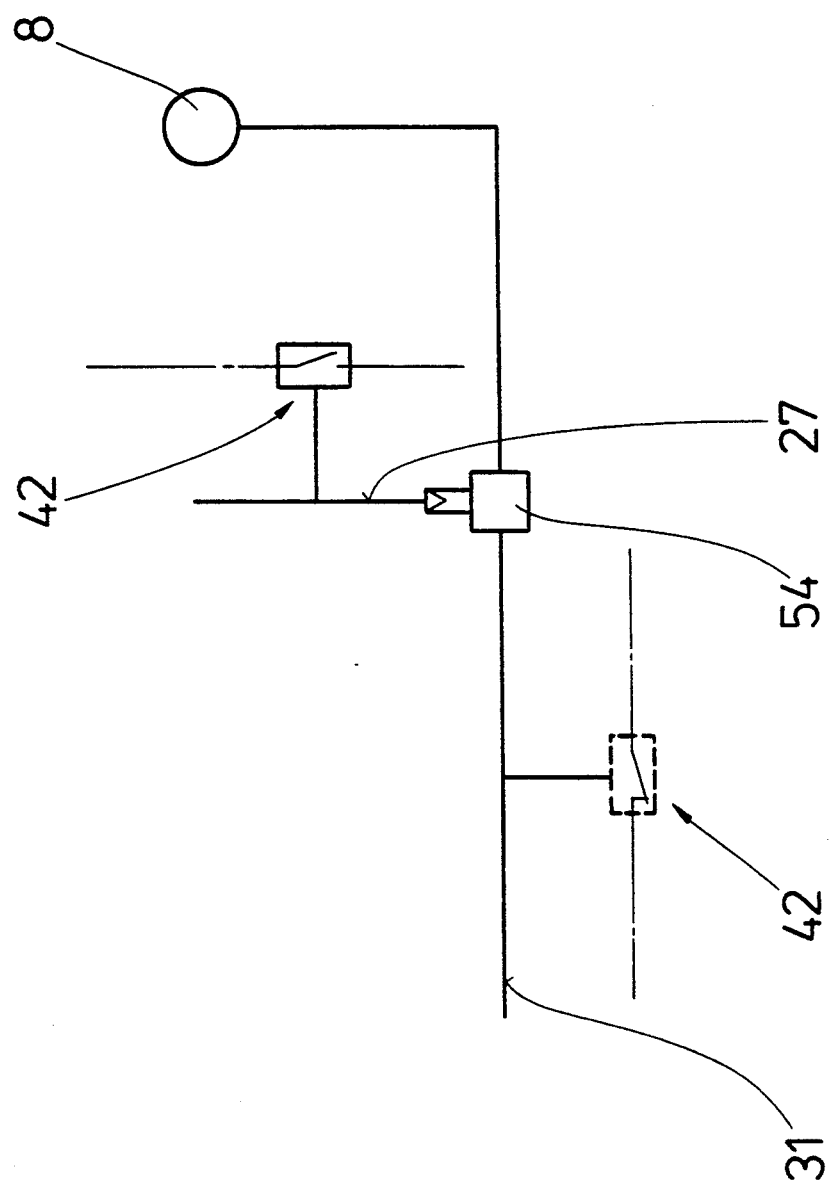
FIG. 8 is a schematic view of an enhanced structure of the brake circuit according to FIGS. 5 through 7.

The mechanical brake-pressure control devices 121 (5, 21), or 141 (5, 41), or (5, 41, 40), or 151 (5, 51, 53), respectively, can be supplemented by a relay valve 54 as illustrated in FIG. 8 for improvement of the time behavior of the brake circuit according to FIGS. 2 through 7 in an emergency operation. This relay valve 54 is to be disposed in the conduit part 27, 31 disposed downstream of the respective restraining device, i.e. of the 3/2-way valve 21 or 41, or 40 or 53, respectively. In this case, the conduit part 27, 31 is subdivided into a control line 27 and a working conduit 31 of the relay valve 54. The relay valve 54 is supplied, in a conventional manner, directly by the pressure storage 8. The representation illustrates further that the threshold-value pressure switch 42 can be disposed at the control line 27 and/or at the working conduit 31 in this enhancement.

Figure 9:
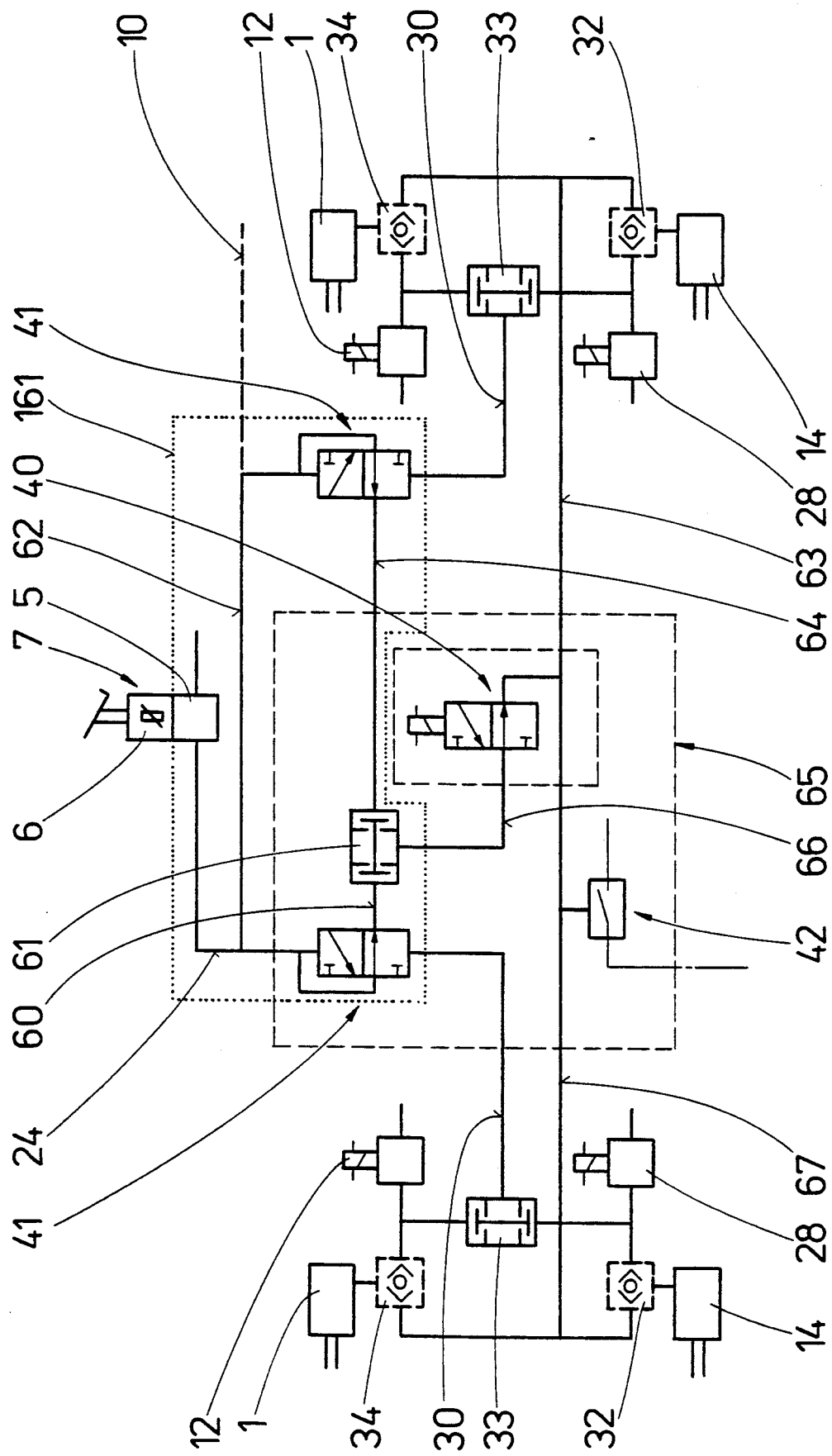
FIG. 9 is a schematic view of a motor vehicle brake plant with two connected brake circuits according to FIG. 6.

Two brake circuits according to the embodiment of FIG. 6 are connected and coupled to form a vehicle braking system according to the embodiment of FIG. 9.

The vehicle or motor-vehicle braking system comprises for each brake circuit an electrical brake-pressure control device of the kind described in the preceding exemplified embodiments. The electrical part 6 of the brake-value transmitter 7 is common to both brake circuits and only this electrical part 6 and the brake-pressure modulators 12, 28 of both brake circuits are represented for purposes of clarity. In addition to the electrical part 6, other further components of these electrical brake-pressure control devices can also be combined functionally and structurally, which holds in particular for the electronic sections and the load-dependent automatic brake-pressure controllers.

The mechanical brake-pressure control devices of each brake circuit are combined to a mechanical brake-pressure control device for the complete vehicle braking system. In this case, a switching to these mechanical brake-pressure control devices takes only place when faults, corresponding to the definition recited in connection with the brake circuit according to FIG. 6, occur in the electrical brake-pressure control devices of the two brake circuits simultaneously.

This is achieved in that indeed an own 3/2-way valve, of the kind of the 3/2-way valve 41 of FIG. 6, is coordinated to each brake circuit, that, however, the conduit parts 60, 66, 67 or 64, 66, 63, respectively, of the pressure lines 24, 60, 66, 67 or 62, 64, 66, 63, respectively, extending from the pressure part 5 of the brake-value transmitter 7 to the actuators 1 and 14 of the brake circuits, disposed downstream of the 3/2-way valves, are connected to each other via an AND member 61.

The device according to the already recited WABCO Westinghouse printed publication "Doppel-Absperrventil 434,500" can be considered as AND member 61. If this AND member 61 is subjected to the pressure only at one input, then it assumes its blocking position. Only if the AND member 61 is subjected to pressure at the two inputs, then it allows to pressure to pass to its outlet and, in fact, allows the lower pressure of the two pressures to pass to its outlet.

If upon actuation of the vehicle braking system a fault occurs in the electrical brake-pressure control device of one of the brake circuits, then the AND member 61 is charged at its input, assumes its blocking position and thereby prevents a switching to the mechanical brake-pressure control device, here designated with the reference numerals 161 (5, 41, 41, 61). Only if the electrical brake-pressure control devices of the two brake circuits are faulty, then the AND member 61 is furnished with pressure at the two inputs and thereby becomes permeable to the pressure and allows a switching to the mechanical brake-pressure control device 161 (5, 41, 41, 61).

If, in this case, an anti-skid system is integrated into the electrical brake-pressure control device, then the blocking, recited in connection with the preceding exemplified embodiments of the mechanical brake-pressure control device 161 (5, 41, 41, 61) in an anti-skid-system operation, can be achieved by way of only one electrically controlled 3/2-way valve of the kind of the 3/2-way valve 40 illustrated in FIG. 6, if this 3/2-way valve, as illustrated, is disposed downstream of the AND member 61 in one conduit part common to the two brake circuits. In this case, the conduit part common to the two brake circuits is designated with the reference numeral 66.

Figure 10:
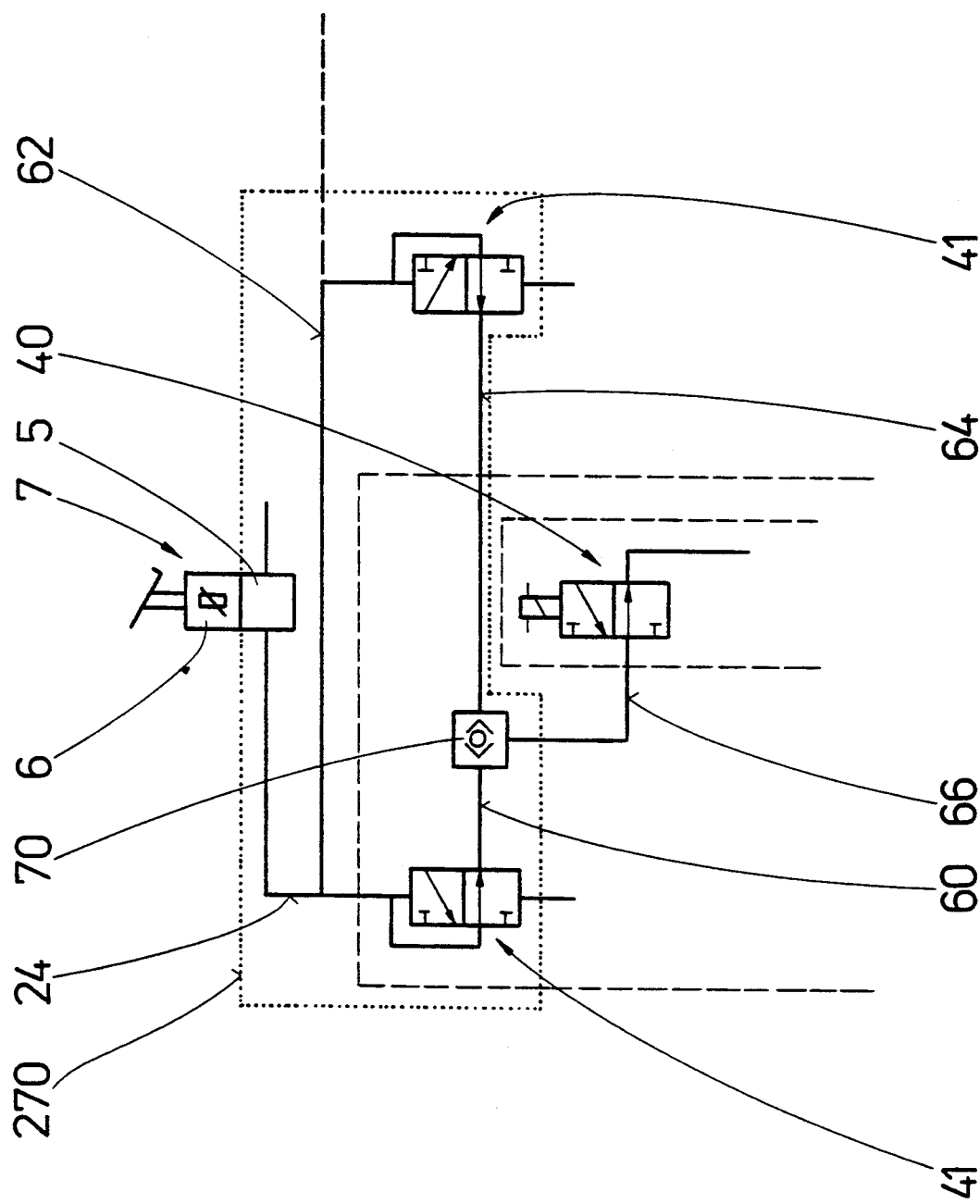
FIG. 10 is a schematic view of the motor vehicle brake plant according to FIG. 9, with a modified feature of the connection.

The embodiment according to FIG. 10 illustrates a section of the preceding exemplified embodiment, wherein the AND member 61 is substituted by an OR member 70. A two-way valve can for example be considered for the OR member 70. The OR member 70 is already permeable when pressure is applied at only one input. Therefore, in contrast to the preceding embodiment, in this embodiment there is a switching to the mechanical brake-pressure control device, designated here with the reference numerals 270 (5, 41, 41, 70), already in case of a fault in the electrical brake-pressure control device of one brake circuit.

The multiple, defining the fault for the vehicle braking system according to FIGS. 9 and 10, of the brake pressure (pressure lines 30), transmitted by the electrical brake-pressure control device, can be predetermined for each brake circuit differently. This means that the 3/2-way valves 41 of the individual brake circuits can deviate from each other at least in the control devices. Use is made of this possibility in particular when the electrical brake-pressure control devices comprise an automatic brake-pressure controller and if this automatic brake-pressure controller exhibits a different automatic control ratio for each brake circuit.

Figure 11:
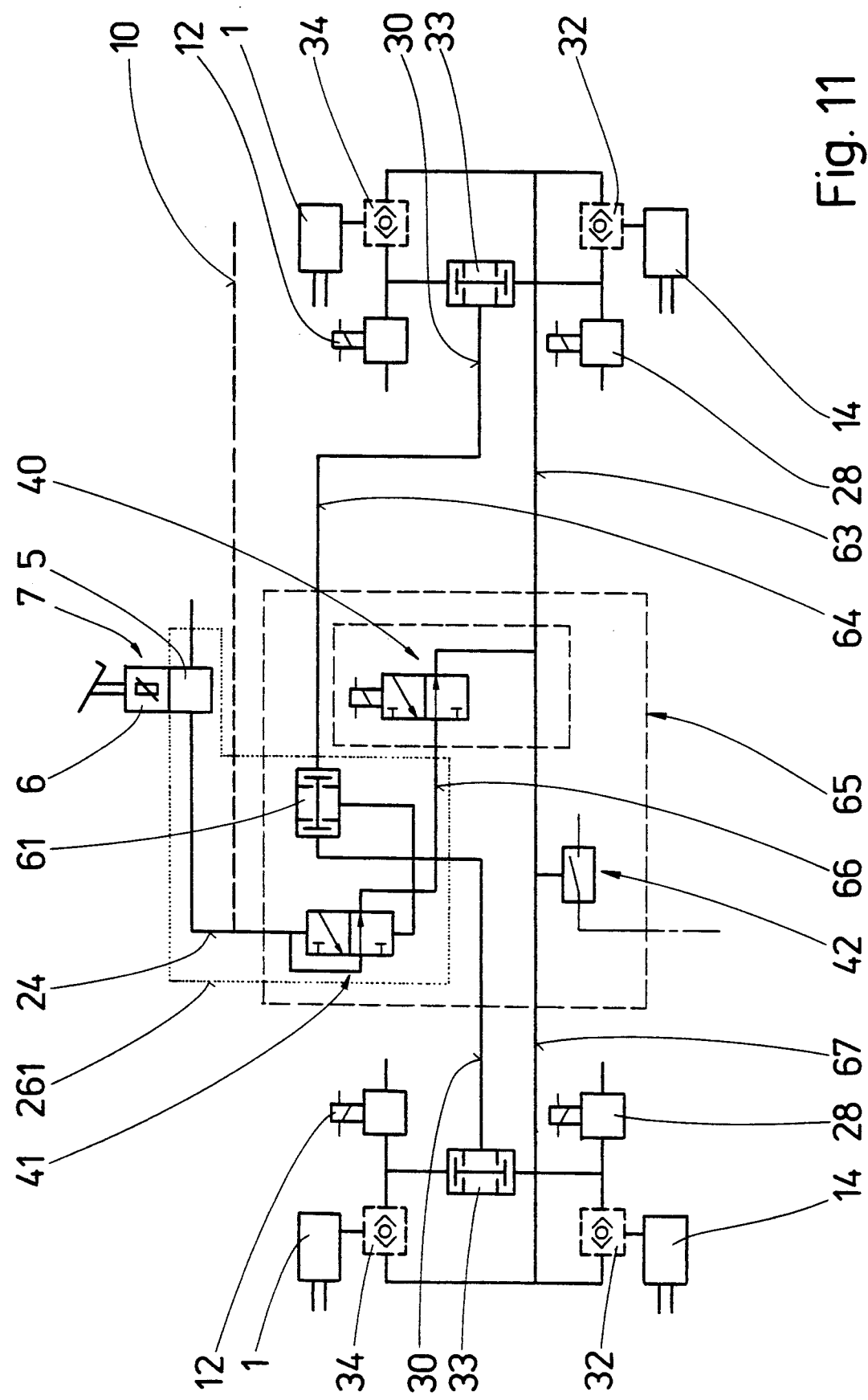
FIG. 11 is a schematic view of the motor vehicle brake plant according to FIG. 10, with yet another feature of the connection.

In case where this possibility does not play a role, FIG. 11 illustrates a possibility for simplification of the vehicle braking system according to FIG. 10. In the vehicle braking system of FIG. 11, the OR member 70 of Fig. 10 is replaced by an AND member 61, and only one 3/2-way valve 41 is furnished for the mechanical brake-pressure control devices 261 (5, 41, 61). The 3/2-way- valve 41 is disposed in a conduit part 24, 66, common to the two mechanical brake-pressure control devices, of the pressure lines 24, 66, 67 or 24, 66, 63, respectively, extending from the pressure part 5 to the actuators 1 and 14. The control input of the 3/2-way valve 41, coordinated to the electrical brake-pressure control device, is connected to the outlet of the AND member 61. Each input of the AND member 61 is fed with the brake pressure, controlled by the electrical brake-pressure control device of one brake circuit. The lower one of the brake pressures, transmitted by the brake-pressure modulators 12 and 28, serves as such brake pressure for the reasons set forth above by way of the double-blocking device 33 of each circuit.

Upon actuation of the vehicle braking system at its control input coordinated to the electrical brake-pressure control device, the 3/2-way valve 41 is fed always with the lowest one of the brake pressures, present in the electrical brake-pressure control device, based on the described disposition of the AND member 61. As was the case with the vehicle braking system according to FIG. 10, this brings about, in each case of fault in an electrical brake-pressure control device, a switching over to the mechanical brake-pressure control device 261 (5, 41, 61).

The 3/2-way valves 41 of the motor-vehicle braking systems according to FIGS. 9, 10, and 11 can be substituted by 3/2-way valves of the kind of the 3/2-way valves 21 of FIG. 5, with the consequence that, as occurs in the brake circuit of FIG. 5, the switching to the mechanical brake-pressure control device occurs only upon a total or nearly a total failure of the electrical brake-pressure control devices (FIG. 9) or, respectively, of the electrical brake-pressure control device of one brake circuit (FIG. 10, 11).

Figure 12:
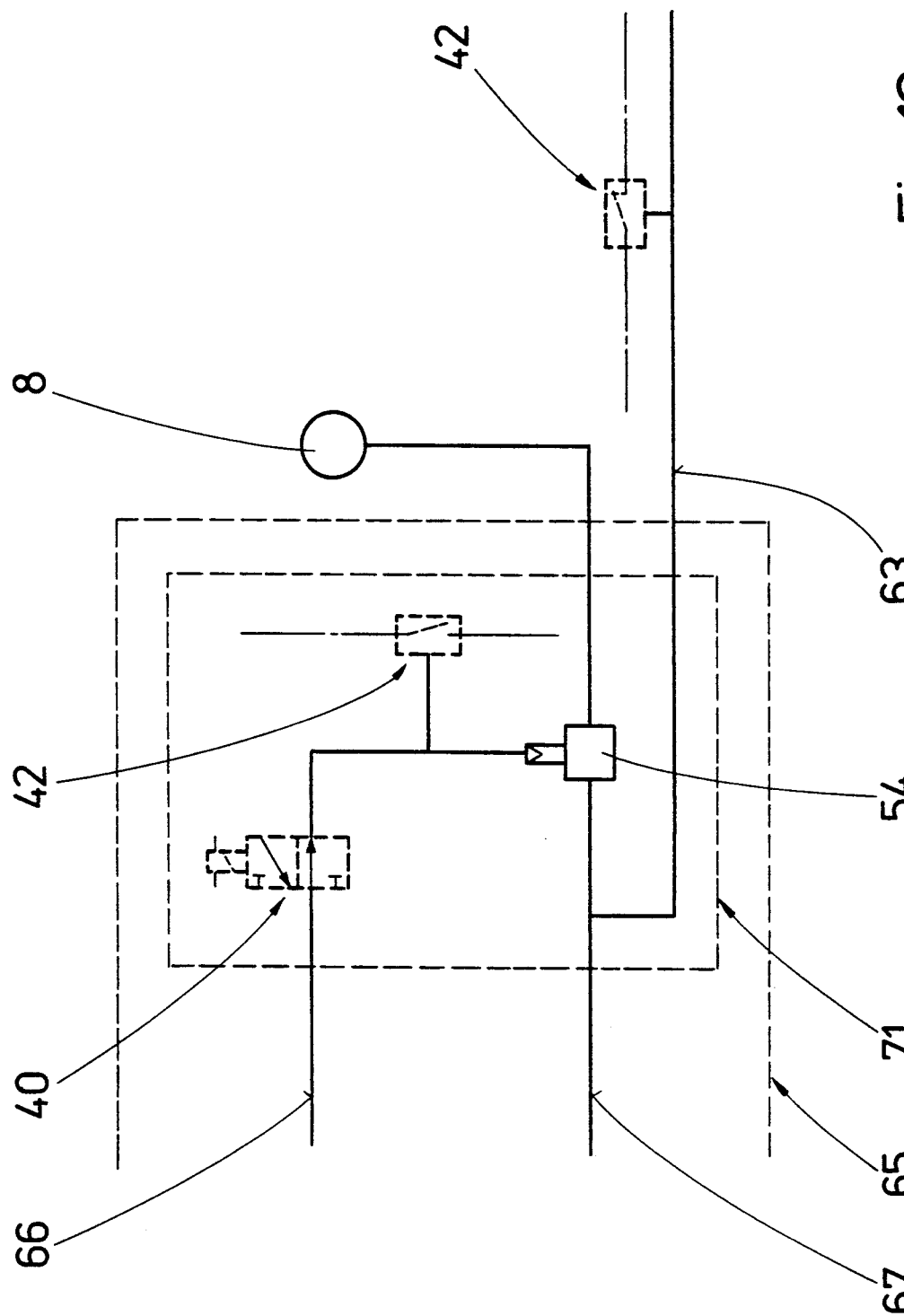
FIG. 12 is a schematic view of an advanced embodiment of the brake circuit according to FIGS. 9 through 11.

As illustrated in FIG. 12, the mechanical brake-pressure control devices 161 (5, 41, 41, 61) or 270 (5, 41, 41, 70) or 261 (5, 41, 61), respectively, of the vehicle braking systems according to FIGS. 9 through 11 can also be supplemented with a relay valve 54 of the kind illustrated in FIG. 8. One relay valve is sufficient if this relay valve is controlled via the common conduit part 66 and if the conduit parts 63 and 67 are connected to the actuators 1 and 14 of the individual brake circuits at its work connection or, respectively, if it is furnished with several work connections to these work connections.

As representative for all the exemplified embodiments, it is further indicated in FIGS. 9 through 11 by dashed framing lines, designated with reference numerals 65 or, respectively 71, that components of the exemplified embodiments can be united to component units. For example, the reference numeral 71 designates a component unit made up of a relay valve 54 and an electrically controlled 3/2-way valve 40 for an anti-skid-system operation, and the reference numeral 65 designates a component unit made up of a 3/2-way valve 41, the AND member 61 or the OR member 70, the threshold-value pressure switch 42, and the 3/2-way-valve 40 or, if necessary, and the component unit 71.

As long as there is no contradictory consequence from the preceding statements, the statements made for the basic structure and for the enhancements and additional embodiments of an exemplified embodiment hold directly or in corresponding way for other exemplified embodiments.

A person of ordinary skill in the art will recognize that the field of application of the invention is not limited to the exemplified embodiments but rather comprises all embodiments which include the features set forth in the appended claims.

While the invention has been illustrated and described as embodied in the context of a brake circuit for a motor-vehicle braking system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A brake circuit with at least one actuator, operated by a feeding of brake pressure, as well as
   with a mechanical brake-pressure control device and an electrical brake-pressure control device, wherein the mechanical brake-pressure control device comprises a pressure part of a brake-value transmitter and a restraining device blocking a pressure line extending from said pressure part of said brake-value transmitter to said actuator at least essentially for such a time as the electrical brake-pressure control device transmits a brake pressure, said restraining device being actuated by the brake pressure transmitted by said electrical brake-pressure control device.

2. The brake circuit according to claim 1, wherein the restraining device is formed as a pressure-controlled 3/2-way valve having a passage position and a blocking position, which 3/2-way valve is fed on the control side with said brake pressure transmitted by the electrical brake-pressure control device.

3. The brake circuit according to claim 2, wherein an anti-skid-system is integrated in the electrical brake-pressure control device, wherein the 3/2-way valve can also be controlled electrically and is set in automatic control operation of the anti-skid system into said blocking position by the anti-skid system.

4. The brake circuit according to claim 2, comprising at least two actuators, wherein
   the electrical brake-pressure control device, based on at least a partial subdivision onto the actuators, transmits to each actuator a brake pressure,
   wherein the control inlet of the 3/2-way valve, coordinated to the electrical brake-pressure control device is fed via a double-blocking device connected, on the one hand, to the pressure outlet of the electrical brake-pressure control device for the one actuator and, on the other hand, to the pressure outlet of the electrical brake-pressure control device for the second actuator, which double-blocking device allows passage of the lower one of the brake pressures.

5. The brake circuit according to claim 2, wherein the brake pressure set by said pressure part of said brake-value transmitter is surveyed in a part of said pressure line extending from said pressure part to said actuator positioned downstream of said 3/2-way valve by a threshold-value pressure switch, which threshold-value pressure switch switches off the electrical brake-pressure control device in case of an occurrence of a threshold value.

6. The brake circuit according to claim 2 comprising a second brake circuit according to claim 3 and forming with this second brake circuit a vehicle braking system wherein the brake-value transmitters of both circuits are built together in one unit, wherein the pressure lines extending from said pressure part of said brake-value transmitter of the two brake circuits are connected to each other downstream of said 3/2-way valves of the two brake circuits via an AND member.

7. The brake circuit according to claim 2, comprising a second brake circuit according to claim 3 and forming with this second brake circuit a vehicle braking system wherein the brake-value transmitters of both circuits are built together in one unit, wherein the pressure lines extending from said pressure part of said brake-value transmitter of the two brake circuits are connected to each other downstream of said 3/2-way valves of the two brake circuits via an OR member.

8. The brake circuit according to claim 2, comprising a second brake according to claim 2 and forming with this second brake circuit a vehicle braking system wherein the brake-value transmitters of both circuits are built together in one unit, wherein the pressure lines extending from said pressure part of said brake-value transmitter of the two brake circuits are connected to each other upstream and partially downstream of said 3/2-way valve and wherein this 3/2-way valve is fed at its control input, coordinated to the electrical brake-pressure control device, via an AND member with the brake pressures, transmitted by the electrical brake-pressure control devices of the two brake circuits.

9. The brake circuit according to claim 1, wherein an anti-skid-system structure is integrated in the electrical brake-pressure control device, wherein an electrically controlled 3/2-way valve having a passage position and a blocking position is disposed in series with the restraining device in said pressure line extending from said pressure part of said brake-value transmitter to said actuator, which 3/2-way valve is set in said blocking position during the automatic-control operation of the anti-skid system by the anti-skid system.

10. The brake circuit according to claim 1, wherein the brake pressure can be fed into the actuator via a two-way valve connected, on the one hand, to the electrical brake-pressure control device and, on the other hand, to said pressure line extending from said pressure part of said brake-value transmitter to said actuator.

11. The brake circuit according to claim 1, comprising
    at least two actuators wherein the electrical brake-pressure control device, based on at least a partial subdivision onto the actuators, transmits to each actuator a brake pressure,
    wherein the lower one of these brake pressures is the brake pressure actuating said restraining device.

12. The brake circuit according to claim 1, wherein at least parts of the mechanical brake-pressure control device are combined to at least one component unit.

13. A brake circuit with at least one actuator operated by the feeding in of brake pressure, as well as
    with a mechanical brake-pressure control device and an electrical brake-pressure control device,
    wherein the mechanical brake-pressure control device comprises a pressure part of a brake-valve transmitter and a restraining device blocking a pressure line extending from said pressure part of said brake-value transmitter to said actuator said restraining device being actuated by a predetermined ratio between the brake pressure set by said pressure part of said brake-value transmitter and the brake pressure transmitted by said electrical brake-pressure control device to block said pressure line extending from said pressure part of said brake-value transmitter to said actuator, said predetermined ratio between said brake pressures occurring for such a time as the brake pressure set by said pressure part of said brake-value transmitter.

14. The brake circuit according to claim 13, wherein the electrical brake-pressure control device comprises also a load-dependent automatic brake-pressure controller,
wherein the predetermined multiple is substantially equal to the largest occurring automatic control ratio of the automatic brake-pressure controller.

15. The brake circuit according to claim 13, wherein the restraining device is formed as a 3/2-way valve controlled by the ratio of two pressures, which 3/2-way valve is fed at one control input with the brake pressure transmitted by the electrical brake-pressure control device and at a second control input with the brake pressure set by said pressure part of said brake-value transmitter.

16. The brake circuit according to claim 15, wherein the brake pressure set by said pressure part of said brake-value transmitter is surveyed in a part of said pressure line extending from said pressure part to said actuator positioned downstream of said 3/2-way-valve by a threshold-value pressure switch, which threshold-value pressure switch switches off the electrical brake-pressure control device in case of an occurrence of a threshold value.

17. The brake circuit according to claim 13, wherein the restraining device comprises an electrical pressure-ratio switch fed, on the one hand, with the brake pressure transmitted by the electrical brake-pressure control device and, on the other hand, with the brake pressure set by said pressure part of said brake-value transmitter, and an electrically controlled 3/2-way valve controlled by an output signal of the electrical pressure-ratio switch.

18. The brake circuit according to claim 17, wherein an anti-skid system structure is integrated in the electrical brake-pressure control device, wherein said 3/2-way valve is controllable electrically in parallel to the pressure ratio switch by the anti-skid system.

19. The brake circuit according to claim 17, comprising
at least two actuators,
wherein the electrical brake-pressure control device, based on at least a partial subdivision onto the actuators, transmits to each actuator a brake pressure,
wherein the inlet of the pressure-ratio switch coordinated to the electrical brake-pressure control device is fed via a double-blocking device connected, on the one hand, to the pressure outlet of the electrical brake-pressure control device for the one actuator and, on the other hand, to the pressure outlet of the electrical brake-pressure control device for the second actuator, which double-blocking device allows passage of the lower one of the brake pressures.

20. The brake circuit according to claim 13, wherein an anti-skid-system structure is integrated in the electrical brake-pressure control device,
wherein an electrically controlled 3/2-way valve having a passage position and a blocking position is disposed in series with the restraining device in said pressure line extending from said pressure part of said brake-value transmitter to said actuator, which 3/2-way valve is set in said blocking position during the automatic-control operation of the anti-skid system by the anti-skid system.

21. The brake circuit according to claim 13, wherein the brake pressure can be fed into the actuator via a two-way valve connected, on the one hand, to the electrical brake-pressure control device and, on the other hand, to said pressure line extending from said pressure part of said brake-value transmitter to said actuator.

22. The brake circuit according to claim 13, comprising
at least two actuators wherein the electrical brake-pressure control device, based on at least a partial subdivision onto the actuators, transmits to each actuator its own brake pressure,
wherein the lower one of these own brake pressures is said brake pressure actuating said restraining device.

23. The brake circuit according to claim 13, wherein at least parts of the mechanical brake-pressure control device are combined to at least one component unit.

* * * * *